(12) United States Patent
Moorman et al.

(10) Patent No.: US 9,995,411 B1
(45) Date of Patent: Jun. 12, 2018

(54) HIGH-TEMPERATURE, ADHESIVE-BASED MICROVALVES AND USES THEREOF

(71) Applicant: National Technology & Engineering Solutions of Sandia, LLC, Albuquerque, NM (US)

(72) Inventors: Matthew W. Moorman, Albuquerque, NM (US); Ronald P. Manginell, Albuquerque, NM (US); Thayne L. Edwards, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 535 days.

(21) Appl. No.: 14/332,831

(22) Filed: Jul. 16, 2014

(51) Int. Cl.
*F16K 99/00* (2006.01)
*B32B 37/12* (2006.01)

(52) U.S. Cl.
CPC ...... *F16K 99/0021* (2013.01); *B32B 37/1207* (2013.01); *F16K 99/0036* (2013.01); *B32B 2037/1223* (2013.01); *F16K 2099/008* (2013.01)

(58) Field of Classification Search
CPC ......... Y10T 137/1797; Y10T 137/1812; Y10T 137/2196; F16K 17/14; F16K 17/40; F16K 17/383; F16K 17/38; F16K 99/0021; F16K 99/0026; F16K 99/003; F16K 2099/008; F16K 13/10; B32B 37/1207; B32B 2037/1223
USPC .......................................................... 251/11
See application file for complete search history.

(56) References Cited

U.S. PATENT DOCUMENTS

| | | |
|---|---|---|
| 5,820,922 A | 10/1998 | Ricco et al. |
| 5,834,627 A | 11/1998 | Ricco et al. |
| 6,096,656 A | 8/2000 | Matzke et al. |
| 6,102,897 A * | 8/2000 | Lang ................. A61M 5/16827 137/67 |
| 6,171,378 B1 | 1/2001 | Manginell et al. |
| 6,224,728 B1 | 5/2001 | Oborny et al. |
| 6,521,188 B1 | 2/2003 | Webster |
| 6,527,003 B1 | 3/2003 | Webster |
| 6,527,835 B1 | 3/2003 | Manginell et al. |
| 6,561,479 B1 * | 5/2003 | Eldridge ................. F16K 13/10 137/341 |
| 6,666,907 B1 | 12/2003 | Manginell et al. |
| 6,679,279 B1 | 1/2004 | Liu et al. |
| 6,699,392 B1 | 3/2004 | Manginell et al. |
| 6,772,513 B1 | 8/2004 | Frye-Mason et al. |
| 6,786,716 B1 | 9/2004 | Gardner et al. |
| 6,902,701 B1 | 6/2005 | Hughes et al. |
| 6,930,051 B1 | 8/2005 | Manginell et al. |

(Continued)

OTHER PUBLICATIONS

U.S. Appl. No. 12/349,634, filed Jan. 7, 2009, Manginell et al.

(Continued)

*Primary Examiner* — Craig Schneider
*Assistant Examiner* — Frederick D Soski
(74) *Attorney, Agent, or Firm* — Helen S. Baca

(57) ABSTRACT

The present invention relates to adhesive-based microvalves, as well as assemblies and cartridges having such microvalves. In particular examples, substantially planar layers of adhesive materials are used to construct both normally-open and normally-closed microvalves for fluid control within microfluidic laminate cartridges. Such microvalves and cartridges can be useful for medical, chemical, and biological investigations.

30 Claims, 6 Drawing Sheets

(56) References Cited

U.S. PATENT DOCUMENTS

| | | | |
|---|---|---|---|
| 7,078,237 | B1 | 7/2006 | Mowry et al. |
| 7,105,098 | B1 | 9/2006 | Shul et al. |
| 7,118,712 | B1 | 10/2006 | Manginell et al. |
| 7,168,298 | B1 | 1/2007 | Manginell et al. |
| 7,195,036 | B2 | 3/2007 | Burns et al. |
| 7,399,449 | B1 | 7/2008 | Oborny et al. |
| 7,422,724 | B1 | 9/2008 | Manginell et al. |
| 7,708,943 | B1 | 5/2010 | Robinson et al. |
| 7,727,314 | B1 | 6/2010 | Manginell et al. |
| 7,799,280 | B1 | 9/2010 | Manginell et al. |
| 7,913,534 | B1 | 3/2011 | Robinson et al. |
| 7,926,514 | B2 | 4/2011 | Park et al. |
| 8,235,073 | B2 | 8/2012 | Namkoong et al. |
| 8,240,336 | B2 | 8/2012 | Welle |
| 8,257,964 | B2 | 9/2012 | Hung et al. |
| 8,281,815 | B2 | 10/2012 | Park et al. |
| 8,298,488 | B1 | 10/2012 | Lewis et al. |
| 8,736,000 | B1 | 5/2014 | Manginell et al. |
| 2004/0007275 | A1* | 1/2004 | Hui Liu ............ B01L 3/502738 137/828 |
| 2006/0219308 | A1* | 10/2006 | Oh ..................... F15C 5/00 137/827 |
| 2008/0187474 | A1* | 8/2008 | Park .................. B01L 3/502738 422/292 |
| 2008/0314465 | A1* | 12/2008 | Park .................... F16K 99/0001 137/827 |
| 2009/0036324 | A1 | 2/2009 | Fan et al. |
| 2009/0251155 | A1 | 10/2009 | Wang et al. |
| 2010/0180953 | A1* | 7/2010 | Cardenas-Valencia ............... F16K 31/025 137/13 |
| 2011/0100476 | A1* | 5/2011 | Park .................. B01L 3/502738 137/13 |
| 2011/0126918 | A1* | 6/2011 | Park .................. B01L 3/502738 137/341 |
| 2011/0129850 | A1 | 6/2011 | Tseng et al. |
| 2012/0214189 | A1 | 8/2012 | Shuler et al. |
| 2012/0231976 | A1 | 9/2012 | Wu et al. |
| 2013/0015536 | A1* | 1/2013 | Feyh ................... F16K 99/0044 257/415 |
| 2013/0133757 | A1* | 5/2013 | Akinwande ........... F16K 99/003 137/74 |

OTHER PUBLICATIONS

U.S. Appl. No. 14/157,378, filed Jan. 16, 2014, Harper et al.

U.S. Appl. No. 14/157,335, filed Jan. 16, 2014, Edwards et al.

Edwards TL, "A system of parallel and selective microchannels for biosensor sample delivery and containment," *Proc. 2010 IEEE Sensors Meeting*, held on Nov. 1-4, 2010 in Kona, HI, pp. 1460-1463.

Edwards TL, "Elucidating the role of interfacial materials properties in microfluidic packages," *Technical Sandia Report SAND2013-0369*, Jan. 2013 (62 pages), issued by Sandia National Laboratories, operated for the United States Department of Energy by Sandia Corporation.

Erickson D et al., "Integrated microfluidic devices," *Anal. Chim. Acta* 2004;507:11-26.

Geiger EJ et al., "A polymer-based microfluidic platform featuring on-chip actuated hydrogel valves for disposable applications," *J. Microelectromech. Sys.* 2010;19(4):944-50.

Guérin LJ et al., "Miniature one-shot valve," *Proc. Eleventh Annual Int'l Workshop on Micro Electro Mechanical Systems (MEMS)*, held on Jan. 25-29, 1998 in Heidelberg, Germany, pp. 425-428.

Jiang C et al., "Evaluation of microvalves developed for point-of-care testing devices using shape-memory polymers," *J. Photopolym. Sci. Technol.* 2013;26(5):581-5.

Liu RH et al., "Self-contained, fully integrated biochip for sample preparation, polymerase chain reaction amplification, and DNA microarray detection," *Anal. Chem.* 2004;76:1824-31.

Liu RH et al., "Single-use, thermally actuated paraffin valves for microfluidic applications," *Sens. Actuat. B* 2004;95:328-36.

Liu Y et al., "DNA amplification and hybridization assays in integrated plastic monolithic devices," *Anal. Chem.* 2002;74:3063-70.

Manginell RP et al., "A materials investigation of a phase-change micro-valve for greenhouse gas collection and other potential applications," *Rev. Sci. Inst.* 2012;83:031301 (11 pp.).

Manginell RP et al., "Diagnostic potential of the pulsed discharged helium ionization detector (PDHID) for pathogenic Mycobacterial volatile biomarkers," *J. Breath Res.* 2013;7:037107 (9 pp.).

Neumann C et al., "Design and characterization of a platform for thermal actuations of up to 588 microfluidic valves," *Microfluid. Nanofluid.* Jan. 2013;14(1-2):177-86.

\* cited by examiner

Normally-open valve

Normally-closed valve

HIGH-TEMPERATURE, ADHESIVE-BASED MICROVALVES AND USES THEREOF

STATEMENT OF GOVERNMENT INTEREST

This invention was made with Government support under contract no. DE-AC04-94AL85000 awarded by the U.S. Department of Energy to Sandia Corporation. The Government has certain rights in the invention.

FIELD OF THE INVENTION

The present invention relates to adhesive-based microvalves. Also described herein are methods for making and using such microvalves, e.g., in fluidic cartridges.

BACKGROUND OF THE INVENTION

Fluidic manipulation on the microscale requires new methodologies. Generally, typical practice involves incorporating external, macro-scale valve components with microfluidic cartridges. Such configurations can result in sample loss and/or fluid leaking.

Integrated valve structures are also employed, and state-of-the-art practice includes depositing extraneous materials into the cartridge or adding pneumatic layers and controllers. These processes can be cumbersome, costly, and difficult to mass-produce. For instance, it can be challenging to automate deposition of phase-change materials into a cartridge, especially in multilayered and laminate cartridges.

Accordingly, there is a need for simplified architectures for microvalves that can be assembled in parallel with current techniques employed for cartridge fabrication. In particular, such microvalves could minimize cost of fabrication, thereby providing disposable fluidic cartridges for single-use detection of biological and chemical targets.

SUMMARY OF THE INVENTION

The present invention includes a simplified valve architecture that can be provided as a normally-open or a normally-closed valve for fluid control within a microfluidic laminate cartridge. In particular, the microvalves are constructed from planar, laser-cut adhesive and from on-chip heater(s) configured to melt a portion of the adhesive material. In one instance, the heater can melt adhesive material, which then blocks a fluidic opening (i.e., thereby closing the microvalve). Alternatively, the heater can melt the fluidic barrier formed from the adhesive material (i.e., thereby opening the microvalve).

The microvalves herein are easily constructed as part of a standard cartridge fabrication process. Creation of these valves requires definition of the adhesive materials, e.g., using laser-cutting, to create the precise geometries required. Valve cycling from an open to a closed state, or vice versa, is accomplished by permanent deformation of the laminate adhesive using localized heating (e.g., to about 200° C.). At this temperature, the adhesive material (e.g., polyester and/or acrylic components of the adhesive) melts and wicks away from the thermal heating zone, which then either opens or closes the fluid chamber to flow.

In non-limiting embodiments, the microvalve assembly of the invention relies on laser-cut adhesive layers to form precise geometries. These geometries define a meltable element, which includes a particular area or volume of adhesive material configured to melt in a manner to close a normally-opened valve or to open a normally-closed valve.

The microvalves can be incorporated into fluidic cartridges. For instance, the cartridge can include alternating layers of patterned polymers, glasses, and metals held together with adhesives.

In some embodiments, the microvalve is a normally-open valve. Such a valve can include three components: a meltable element formed from a precisely-cut adhesive material, a fluidic via connecting two fluidic chambers or layers, and a miniaturized energy source (e.g., thermal source). Any useful energy source can be employed (e.g., microfabricated, metal heaters defined using conventional photolithography processes onto glass). The miniaturized heaters are defined such that when the layers of the laminate cartridge are assembled, they overlap specific features in the adhesive materials and they are within close proximity to the fluidic via. Once sufficient power is placed upon the miniaturized thermal source (e.g., about 0.85 W), the adhesive material (e.g., polyester/acrylic) begins to melt. The geometry of the valve design wicks melted material away from the hotspot and into the fluidic via. This process takes on the order of tens of seconds to complete, after which power is removed. Then, the polymer solidifies within the via and blocks it to fluid flow.

In other embodiments, the microvalve is a normally-closed valve. Such a valve can include two components: a meltable element formed from a precisely-cut adhesive material and a miniaturized energy source. A layer of adhesive material (e.g., about 275 µm wide) is defined such that a thin strip of adhesive divides a fluid channel and forms a fluidic barrier that prevents fluid flow. Once sufficient power is placed upon the miniaturized thermal source (e.g., about 0.85 W), the adhesive material (e.g., polyester/acrylic) begins to melt. The geometry of the valve design wicks melted material away from the hotspot and into the area around the fluidic barrier. This process takes on the order of seconds to complete, after which a pneumatic or fluid pulse is delivered that sweeps melted material away from the hotspot and opens the channel to flow. Power is removed and the remaining polymer solidifies, leaving a clear path for fluid flow.

Accordingly, in a first aspect, the invention features a normally-open microvalve assembly including: a fluidic opening disposed between a first chamber and a second chamber; a meltable element including an adhesive material, where the meltable element is disposed in proximity to the fluidic opening; and an energy source in contact with at least a portion of the meltable element, where the energy source is configured to melt the adhesive material, thereby allowing melted adhesive material to substantially block the fluidic opening in order to substantially minimize fluidic communication between the first and second chambers.

In some embodiments, the meltable element is provided as an adhesive layer disposed above the intermediate layer. In other embodiments, the adhesive layer is the first layer.

In some embodiments, the fluidic opening is a via disposed between the first and second chambers; and the meltable element is disposed in proximity to the via and is configured to substantially block the via upon melting of the adhesive material. In other embodiments, the first chamber is provided in a first layer, the second chamber is disposed in a second layer, and the via is disposed in an intermediate layer disposed between the first and second layers.

In some embodiments, a center-to-center spacing between the fluidic opening and the energy source is less than about 2 mm (e.g., of from about 50 µm to about 2 mm, such as from 50 µm to 0.5 mm, 50 µm to 1 mm, 50 µm to 1.5 mm, 100 µm to 0.5 mm, 100 µm to 1 mm, 100 µm to 1.5 mm, 100

μm to 2 mm, 0.5 mm to 1 mm, 0.5 mm to 1.5 mm, 0.5 mm to 2 mm, 1 mm to 1.5 mm, or 1 mm to 2 mm). In particular embodiments, the energy source has a dimension less than about 2 mm, 1.5 mm, 1 mm, 0.75 mm, or 0.5 mm.

In another aspect, the invention features a normally-closed microvalve assembly including: a first chamber and a second chamber (e.g., where both of the first and second chambers are located in a first layer); a meltable element including an adhesive material, where the meltable element forms a fluidic barrier between the first and second chambers; and an energy source in contact with at least a portion of the meltable element, where the energy source is configured to melt the adhesive material, thereby allowing the fluidic barrier to be melted in order to substantially establish fluidic communication between the first and second chambers.

In some embodiments, the fluidic barrier divides a chamber in the first layer into the first and second chambers.

In other embodiments, the assembly further includes a retaining chamber configured to receive the melted adhesive material of the fluidic barrier.

In yet other embodiments, the fluidic barrier, the first chamber, and the second chamber are each disposed in the first layer, where the first layer includes the adhesive material.

In another aspect, the invention features a fluidic cartridge including one or more single-use microvalve assemblies (e.g., any described herein). In further embodiments, the cartridge includes one or more single-use microvalve assemblies (e.g., any described herein).

In yet another aspect, the invention features a multilayered, fluidic cartridge including: a first channel disposed in a first layer; a second channel disposed in a second layer; a fluidic opening configured for fluidic communication between the first and second channels; a first meltable element in proximity to the fluidic opening; and an energy source in contact with at least a portion of the first meltable element, where the energy source is configured to melt the adhesive material, thereby allowing melted adhesive material to substantially block the fluidic opening in order to substantially minimize fluidic communication between the first and second channels.

In further embodiments, the cartridge includes a second meltable element disposed in the first channel to form a fluidic barrier.

In some embodiments, the energy source is in contact with at least a portion of the second meltable element. In particular embodiments, the energy source is configured to melt the adhesive material of the second meltable element, thereby allowing the fluidic barrier to be melted.

In some embodiments, the first layer includes a substantially planar layer of an adhesive material. In other embodiments, the first and second meltable elements are disposed in the first layer. In yet other embodiments, the first and second meltable elements are both disposed in a substantially planar layer of an adhesive material.

In another aspect, the invention features a method of fabricating a microvalve assembly including: i) providing a first layer including at least one first chamber (e.g., a first channel); ii) aligning a portion of an adhesive layer with the first chamber; and iii) contacting an energy source with at least a portion of a first meltable element, where the first meltable element includes an area of the adhesive layer in proximity to the first chamber, thereby forming the microvalve assembly. In some embodiments, the adhesive layer includes a substantially planar layer of an adhesive material having a melting temperature of from about 100° C. to about 250° C.

In some embodiments, prior to step ii), the method includes disposing an intermediate layer between the first layer and the adhesive layer. In other embodiments, the method further includes aligning a portion (e.g., at least one fluidic opening) of the intermediate layer with the first chamber. In yet other embodiments, the intermediate layer includes at least one fluidic opening. In further embodiments, aligning includes bonding and/or contacting one or more structure.

In some embodiments, the portion of the adhesive layer is the first meltable element, a second meltable element, or a second chamber disposed in the adhesive layer.

In other embodiments, the portion of the adhesive layer is the first meltable element, and step ii) includes aligning the first meltable element to be in proximity to the first chamber. In other embodiments, aligning allows fluidic communication with the first chamber, thereby forming a normally-open microvalve assembly.

In some embodiments, the portion of the adhesive layer is the second chamber (e.g., second channel) disposed in the adhesive layer, and step ii) includes aligning the second chamber with the first chamber. In other embodiments, aligning allows fluidic communication with the first chamber, thereby forming a normally-open microvalve assembly.

In some embodiments, the portion of the adhesive layer is the first meltable element, and step ii) includes aligning the first meltable element with the first chamber. In other embodiments, aligning blocks fluidic communication with the first chamber, thereby forming a normally-closed microvalve assembly.

In some embodiments, step ii) further includes contacting and/or bonding the portion of the adhesive layer with the first chamber.

In any embodiment herein, each of the first and second chambers is, independently, configured to receive one or more fluids.

In any embodiment herein, the meltable element includes a substantially planar layer of the adhesive material. In further embodiments, the adhesive material has a melting temperature of from about 50° C. to about 350° C. (e.g., from 100° C. to 250° C. or from 75° C. to 250° C., as well as any ranges described herein).

In any embodiment herein, the meltable element includes an adhesive tape, which includes a backing layer having a top side and a bottom side and a layer of the adhesive material disposed on the top and/or bottom sides.

In any embodiment herein, each of the first and second chambers is, independently, a microfluidic channel, a nanofluidic channel, or a reservoir.

In any of embodiment herein, the adhesive material includes an acrylate, an acetate, a styrene, and/or any other useful adhesive material (e.g., any described herein).

Definitions

As used herein, the term "about" means +/−10% of any recited value. As used herein, this term modifies any recited value, range of values, or endpoints of one or more ranges.

By "fluidic communication," as used herein, refers to any duct, channel, tube, pipe, chamber, or pathway through which a substance, such as a liquid, gas, or solid may pass substantially unrestricted when the pathway is open. When the pathway is closed, the substance is substantially restricted from passing through. Typically, limited diffusion of a substance through the material of a plate, base, and/or a substrate, which may or may not occur depending on the compositions of the substance and materials, does not constitute fluidic communication.

By "layer" is meant a substantially continuous structure having a top surface and a bottom surface, where these top and bottom surfaces are capable of contacting another substantially continuous structure. Such continuous structures can have one or more modifications (e.g., removed or cut portions, added portions, planar structures, patterned structures, etc.), so long as such modifications do not significantly affect lamination and contact between two layers. For instance, a continuous structure includes those having modifications encompassing less than about 70% of the area of the top or bottom surface. Exemplary continuous structures include those having modifications such that accuracy and robustness of the assembly process is not structurally compromised.

By "microfluidic" or "micro" is meant having at least one dimension that is less than 1 mm. For instance, a microfluidic structure (e.g., any structure described herein) can have a length, width, height, cross-sectional dimension, circumference, radius (e.g., external or internal radius), or diameter that is less than 1 mm.

As used herein, the terms "top," "bottom," "upper," "lower," "above," and "below" are used to provide a relative relationship between structures. The use of these terms does not indicate or require that a particular structure must be located at a particular location in the apparatus.

Other features and advantages of the invention will be apparent from the following description and the claims.

DETAILED DESCRIPTION OF THE INVENTION

The present invention relates to microvalve and microvalve assemblies including an adhesive material. In particular, the architecture herein can be adapted to form either normally-open (NO) or normally-closed (NC) valves. Furthermore, any useful number and type of valve (e.g., NO or NC) can be incorporated into a laminate device without requiring additional materials.

Figure 1A:
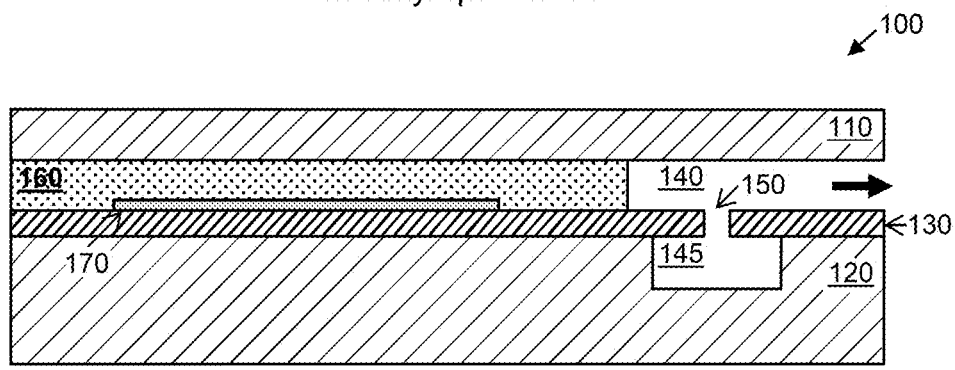
FIG. 1A-1C shows schematics of an exemplary normally-open (NO) microvalve assembly 100. Provided is a cross-sectional view (A) before and (B) after microvalve actuation, as well as (C) a plan view of the assembly.
Figure 1B:
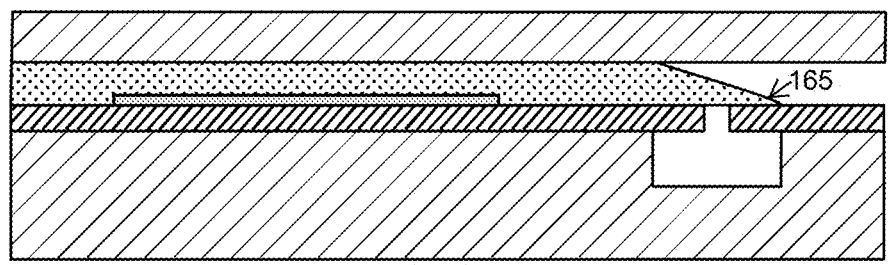
Figure 1C:
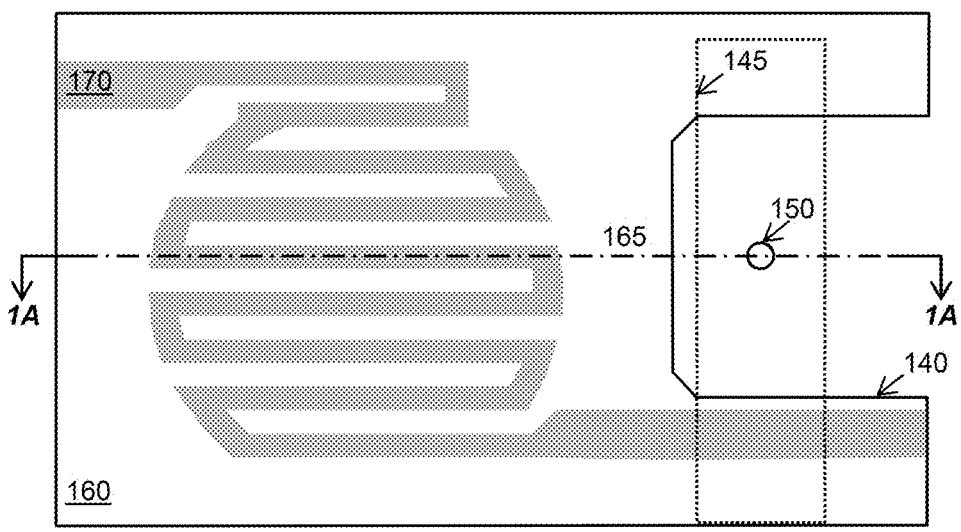

An exemplary NO microvalve is shown in FIG. 1A-1C. Prior to actuation (FIG. 1A), the NO microvalve assembly 100 includes a first chamber 140, a fluidic opening (e.g., a via) 150 disposed in an intermediate layer 130, a second chamber 145, an adhesive layer 160, and a heater 170. The first and second chambers can be formed in any useful manner. In FIG. 1A, the first chamber 140 is formed by a top layer 110 and the edge of the adhesive layer 160, and the second chamber is disposed within the second layer 120. Other configurations can be employed. For instance, the first chamber can be disposed within the top layer, or the second chamber can be formed using multiple laminated layers (e.g., a fluidic opening in a second layer, which is disposed above a third layer that forms the bottom of the second chamber).

During actuation, the heater 170 is activated for a sufficient time and at a sufficient power to allow the meltable element to melt. After actuation (FIG. 1B), the meltable element 165 blocks the fluidic via 150.

The NO microvalve is actuated by localized heating of a heater 170. In addition, the adhesive layer 160 is designed such that, upon heating and melting, the melted adhesive material will substantially block or occlude the fluidic via 150. This design includes determining the geometry of the laser-cut first chamber 140, the proximity of the edge (or meltable element) of the adhesive layer to the via 150, the center-to-center distance between the fluidic via 150 and the heater 170 (e.g., a center-to-center distance of less than about 2 mm), the dimension (e.g., height, width, diameter, etc.) and geometry of the via 150, the height of the adhesive layer 160, the power applied to the heater 170 so that is sufficient to melt the adhesive material, the geometry of the heater 170 (e.g., to define the heating zone), and/or the material choice for the top layer 110 and intermediate layer 130 (e.g., to promote or localize heat transfer).

FIG. 1C shows an exemplary schematic that provides the geometry of the heater, chambers, adhesive layer, and meltable elements. Shown are a serpentine heater 170 that provides the energy source to melt the adhesive material, as well as a fluidic via 150 configured to provide fluidic communication between a first chamber 140 and a second chamber 145. The second chamber 145 is disposed beneath the adhesive layer 160, which defines the boundary of the first chamber 140. The meltable element 165 is the portion of the adhesive layer 160 located between the heater 170 and the fluidic via 150, where this portion is configured to melt and block the fluidic via.

Figure 2A:
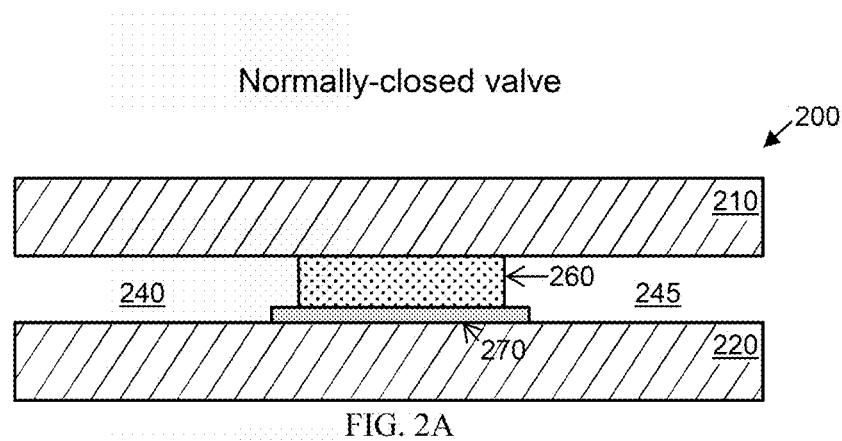
FIG. 2A-2C shows schematics of an exemplary normally-closed (NC) microvalve assembly 200. Provided is a cross-sectional view (A) before and (B) after microvalve actuation, as well as (C) a plan view of the assembly.
Figure 2B:
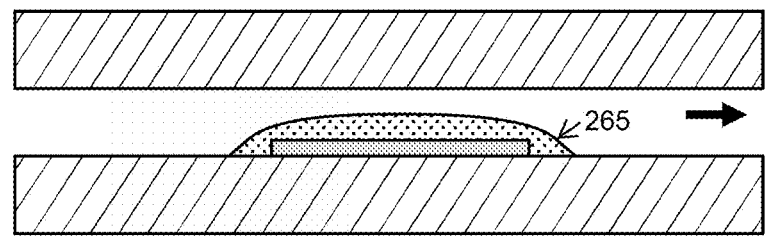
Figure 2C:
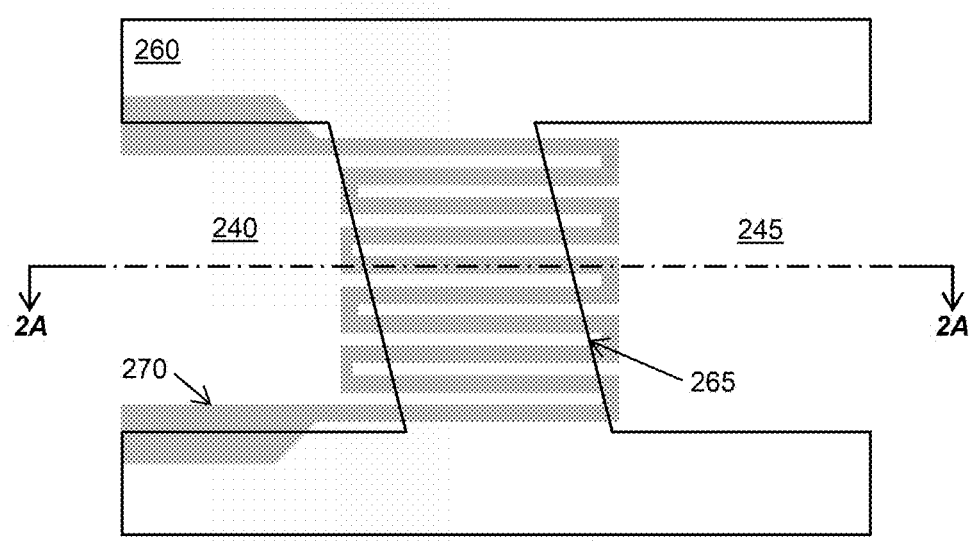

An exemplary NC microvalve is shown in FIG. 2A-2C. Prior to actuation (FIG. 2A), the NC microvalve assembly 200 includes a first chamber 240, a second chamber 245, a meltable element forming the fluidic barrier 260, and a heater 270. The first and second chambers are formed by the top layer 210, the bottom layer 220, and the fluidic barrier 260.

During actuation, the heater 270 is activated for a sufficient time and at a sufficient power to allow the meltable element to melt. After actuation (FIG. 2B), the meltable element 265 melts, thereby substantially establishing fluidic communication by way of a fluidic path between the first and second chambers 240, 245.

In particular embodiments, the first and second chambers, as well as the meltable element, are formed in the same adhesive layer. As shown in FIG. 2C, the adhesive layer 260 includes cut (e.g., laser-cut) portions that form the first chamber 240 and the second chamber 245. A strip of adhesive material is maintained between these two chambers to form the meltable element 265. In addition, the heater 270 and meltable element 265 are designed to facilitate effective melting of the adhesive material, as well as wicking of the melted material away from the fluidic path formed by actuating the heater. In some embodiments, the cartridge further includes a retaining chamber configured to receive the melted adhesive material of the fluidic barrier, thereby further wicking the material away from the formed fluidic path. As described above for the NO microvalve, additional design considerations and chamber configurations can be incorporated into the NC microvalve.

The microvalves of the invention can be incorporated in any useful manner in a cartridge. An exemplary cartridge 300 is provided in FIG. 3. As can be seen, the cartridge 300 includes an adhesive layer 360 and a heater 370 having two heating elements 371, 372. The adhesive layer 360 includes removed or cut portions that define a first chamber 341, a second chamber 342, and a retaining chamber 366. The remaining portions of the adhesive layer 360 define the meltable elements, including a meltable element 361 for an NO valve and a meltable fluidic barrier 362 for an NC valve. The first heating element 371 is located near the first via 351 and the meltable element 361 to form the NO valve. The second heating element 372 is located near the fluidic barrier 362 to form the NC valve.

An intermediate layer underlies the adhesive layer 360 and includes fluidic vias 351, 352. Then, underneath this intermediate layer is a channel layer including a first fluidic chamber 345 in fluidic communication with the first chamber 341, as well as a second fluidic chamber 346 in fluidic communication with the second chamber 342.

Figure 4:
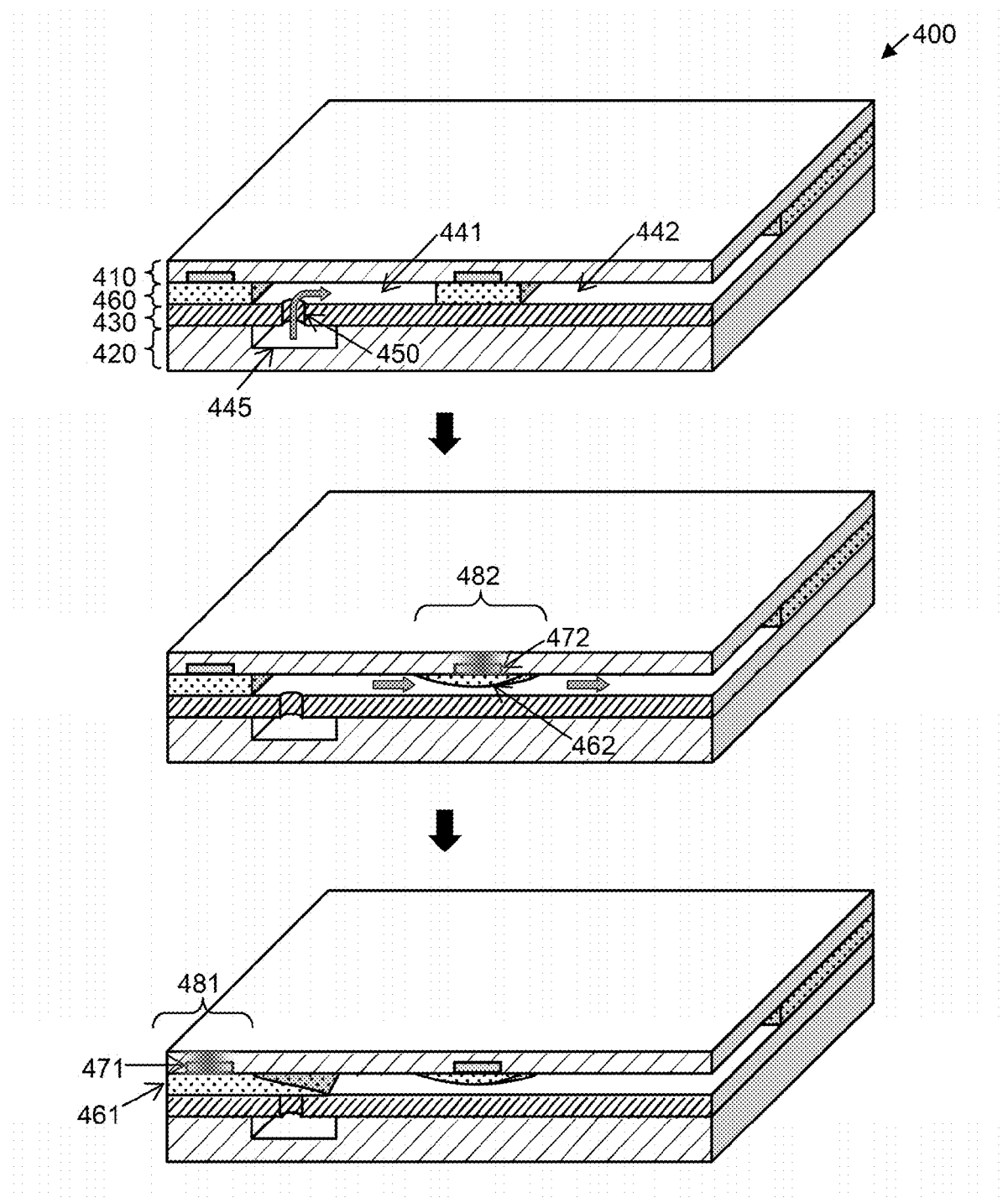
FIG. 4 is a schematic showing sequential operation of an exemplary cartridge 400 having both NO and NC microvalves.

The valves can be operated in any useful manner. FIG. 4 shows an exemplary use of a cartridge 400 having both an NO valve 481 and an NC valve 482. The cartridge 400 includes a top layer 410; an adhesive layer 460 defining meltable elements 461, 462; an intermediate layer 430 having a fluidic via 450; and a bottom layer 420 including a lower chamber 445. The adhesive layer 460 also defines the first chamber 441 and the second chamber 442, which are separated by a fluidic barrier 462. Heating elements can be disposed in any useful layer, and heaters 471, 472 in FIG. 4 are integrated into the top layer 410.

In use, the cartridge has an NO valve 481 that allows for fluidic communication between the lower chamber 445 and the first chamber 441 by flow through the fluidic via 450 (FIG. 4, top, gray arrow). Then, the NC valve 482 is actuated by providing power to the second heating element 472, thereby melting the fluidic barrier 462 to unblock the fluidic path (FIG. 4, middle). Finally, the NO valve 481 is actuated by providing power to the first heating element 471, thereby melting the meltable element 461 to block the via 450 (FIG. 4, bottom). Alternatively, the cartridge can be used by first closing the NO valve and then opening the NC valve.

A plurality of microvalves can be employed in a single cartridge. For such a combination, any useful sequence can be employed to actuate (e.g., open-close, close-open, open-close-close, close-open-open, etc.) the valves. Such actuation sequences can be adapted to open and close fluidic paths, which in turn can be used to perform useful incubation, reaction, and sampling steps (e.g., target amplification or identification steps). Complicated actuation sequences can be implemented by using one or more switches, microcontrollers, etc., to provide power to particular heating elements at particular setpoints (e.g., at particular time setpoints, temperature setpoints, pressure setpoints, etc.).

The cartridges of the invention can be fabricated by any useful technique (e.g., any described herein). In particular embodiments, the cartridge is a multilayered cartridge formed by laminating multiple layers into a single structure. The microvalve assemblies of the invention are particularly useful for such multilayered cartridges because the adhesive layer can be precisely dimensioned and cut (e.g., using a $CO_2$ laser) to accommodate various chamber and microvalve configurations.

Figure 5:
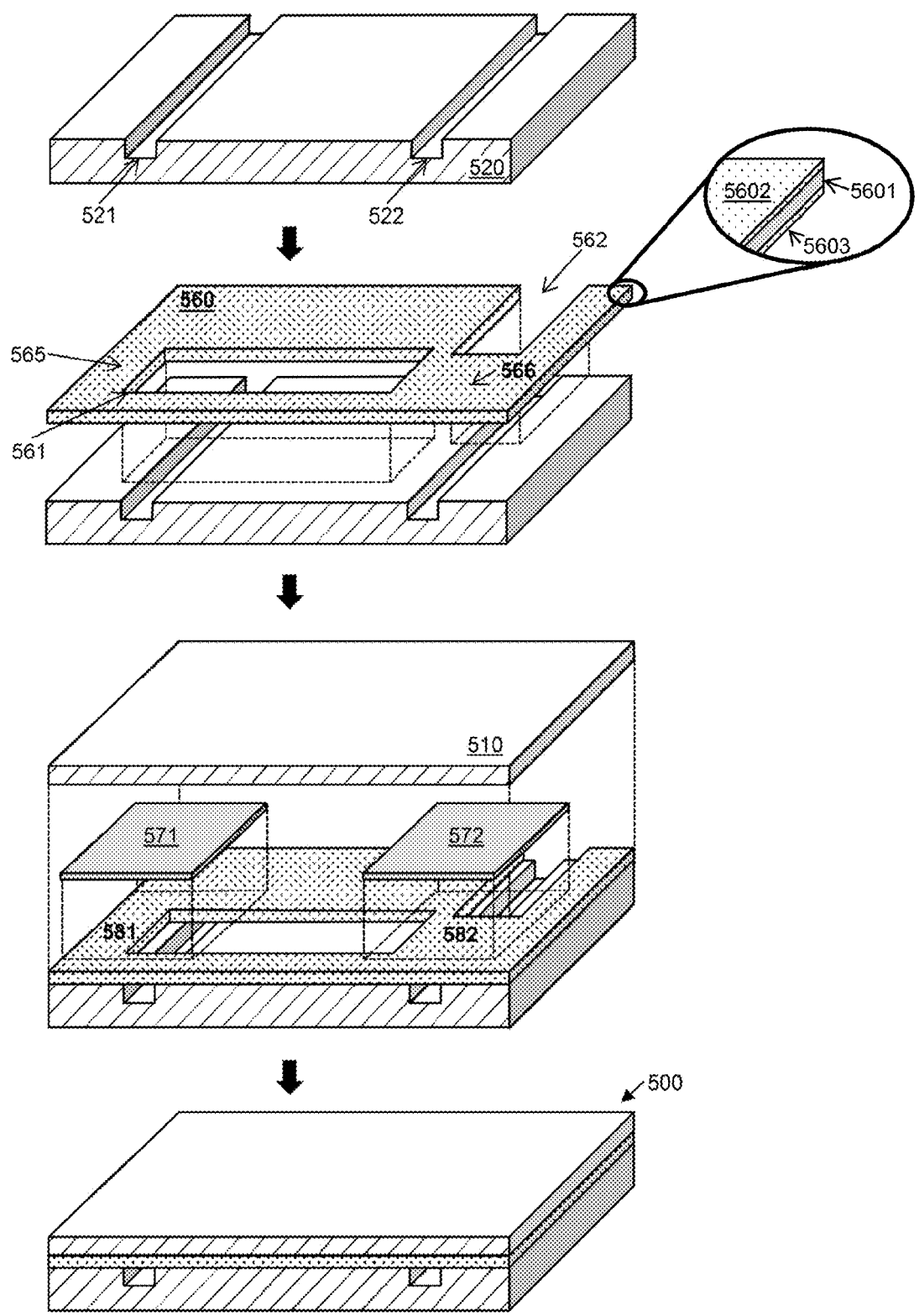
FIG. 5 is a schematic showing step-by-step assembly of an exemplary multilayered cartridge 500 having parallel channels in a second layer 520.

Multilayered cartridges can have any useful configuration. FIG. 5 shows an exemplary multilayered cartridge 500 having three layers. The bottom layer 520 is a channel layer including a first lower chamber 521 (shown as a channel) and a second lower chamber 522 (shown as a channel).

Then, an adhesive layer 560 is disposed above the bottom layer 520. The adhesive layer 560 includes cut portions that define a first chamber 561 and a second chamber 562. These chambers are designed to allow for fluidic communication between chambers in the first layer 520 and in the adhesive layer 560. As can be seen, the first lower chamber 521 is in fluidic communication with the first chamber 561 in the adhesive layer, and the second lower chamber 522 is in fluidic communication with the second chamber 562 in the adhesive layer.

Figure 6:
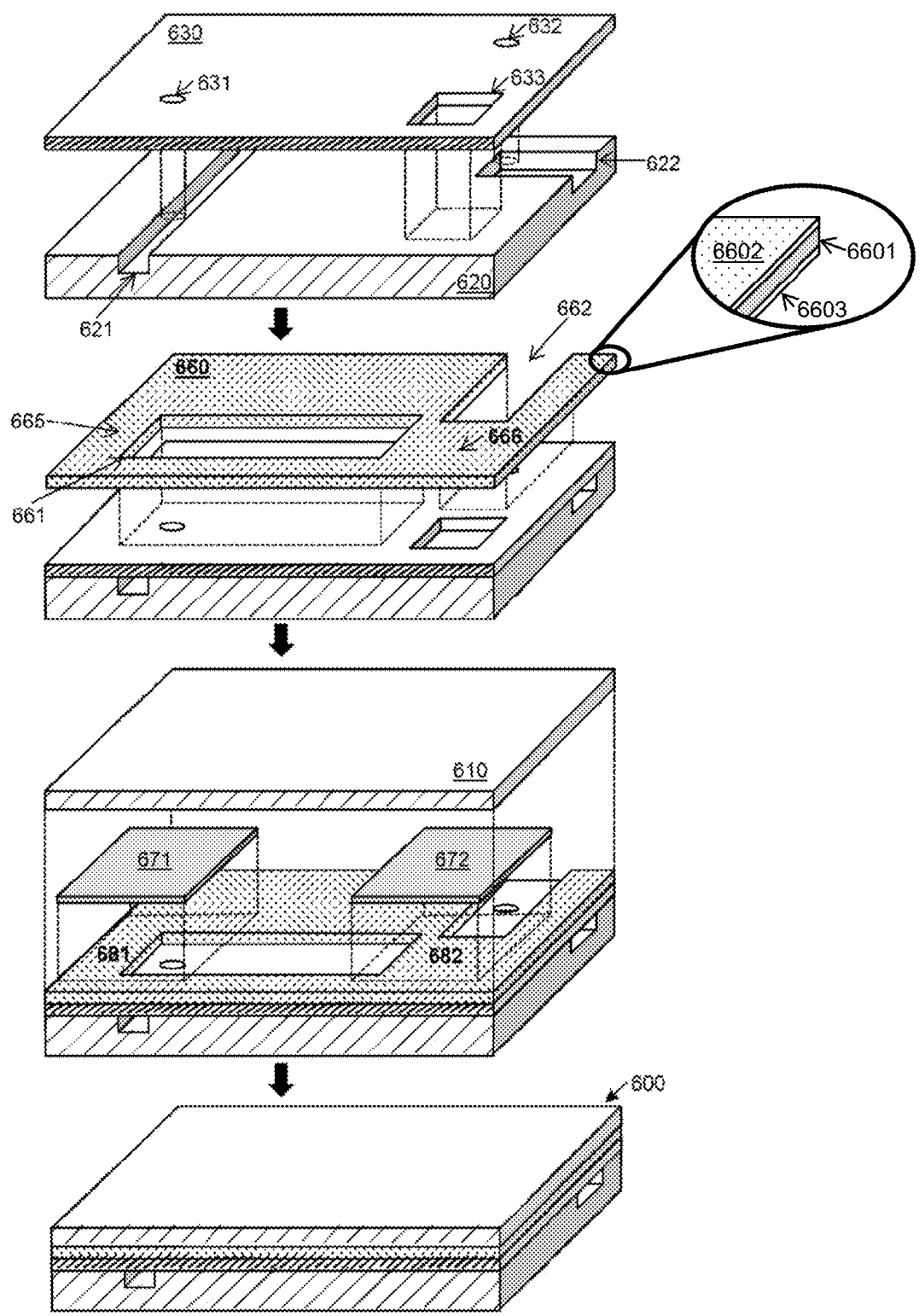
FIG. 6 is a schematic showing step-by-step assembly of another exemplary multilayered cartridge 600 having an intermediate layer 630 and perpendicular channels in a second layer 620.

The adhesive layer 560 also includes remaining portions that define the first meltable element 565 configured to, upon melting, block the fluidic path between the first lower chamber 521 and the first chamber 561. Optionally, an intermediate layer having one or more vias can be disposed between the channel layer 520 and the adhesive layer 560 (e.g., see FIG. 4 or 6). Also provided is a second meltable element 566 that forms a fluidic barrier between the first and second chambers 561, 562. As can be seen, the first and second meltable elements 565, 566 are disposed in a single adhesive layer 560, which is further disposed between the top and bottom layers 510, 520.

Then, heating elements 571, 572 are provided to contact the adhesive layer 560. In particular, the heating zones 581, 582 of the heater should be aligned with the location of the meltable elements 565, 566. The heater can either be in direct contact with the adhesive layer or in indirect contact (e.g., by way of a thermal exchange layer) between the heater and the adhesive layer. Optionally, the heating elements 571, 572 can be embedded in top layer 510.

Any useful chamber configuration and additional layers can be employed for the multilayered cartridge of the invention. For instance, an exemplary cartridge 600 is provided in FIG. 6. As can be seen, the bottom layer 620 is a channel layer including a first lower chamber 621 (shown as a channel) and a second lower chamber 622 (shown as a channel). An intermediate layer 630 is disposed above the bottom layer. In particular, this intermediate layer 630 includes a first fluidic via 631 configured to be in fluidic communication with the first lower chamber 621, a second fluidic via 632 configured to be in fluidic communication with the second lower chamber 622, and a retaining chamber 633 configured to be aligned with a fluidic barrier 666.

Then, an adhesive layer 660 is disposed above the intermediate layer 630. Similar to the adhesive layer in FIG. 5, the adhesive layer 660 includes cut portions that define a first chamber 661 and a second chamber 662. These chambers are designed to allow for fluidic communication between chambers in the first layer 620, the vias in the intermediate layer 630, and the chambers in the adhesive layer 660.

The adhesive layer 660 also includes remaining portions that define the first meltable element 665 configured to, upon melting, blocking the first via 631. Also provided is a second meltable element 666 that forms a fluidic barrier between the first and second chambers 661, 662. In addition, the fluidic barrier is configured to melt into the retaining chamber 633.

Then, heating elements 671, 672 are provided to contact directly or indirectly the adhesive layer 660. In particular, the heating zones 681, 682 of the heater should be aligned with the location of the meltable elements 665, 666. Finally, a top layer 610 is disposed above the heating elements. Optionally, the heating elements 671, 672 can be embedded in top layer 610.

Additional configurations, materials, components, and layers can be employed, as described herein.

Chambers

The present apparatus can include one or more chambers, which can be configured to substantially enclose a fluid or a substance in the fluidic cartridge. Such chambers can include one or more inlets, outlets, fluidic opening (e.g., vias), fluidic barriers, or any other structure to allow for fluidic communication between one or more chambers, sample ports, vents, etc. Exemplary chambers include a channel, a reservoir, etc., having any useful geometry or dimension.

The chambers can be designated for a particular use. Particular uses for such chambers include a sample chamber for receiving and/or storing a test sample, an incubation chamber for incubating a test sample (e.g., to amplify one or more targets and optionally containing media and/or host cells for such amplification), a reagent chamber containing one or more reagents for detecting one or more targets, a sterilization chamber containing one or more reagents to sterilize or disinfect the test sample (e.g., containing one or more sterilization agents, as described herein), an assay chamber for conducting one or more assays to detect one or more targets (e.g., an assay chamber containing a capillary bed for a lateral flow assay), and/or a waste chamber for storing one or more by-products of the assay. Each of these chambers can be interconnected by a valve (e.g., an NC valve and/or NO valve, such as any described herein) and/or a channel that can optionally include such a valve in its fluidic path.

Adhesive Material

The meltable element of the invention includes an adhesive material. In particular non-limiting embodiments, in order to simplify fabrication, a plurality of meltable elements is disposed in a single adhesive layer. Then, the patterned adhesive layer is aligned with one or more chambers disposed on a first layer. Optionally, additional layers including fluidic opening or other chambers can be included. Finally, the stack of multiple layers can be aligned and assembled into a single, multilayered cartridge using any useful fabrication technique (e.g., any described herein).

An adhesive material can be chosen based on its melting temperature, such as of from about 50° C. to about 350° C. (e.g., from 50° C. to 100° C., 50° C. to 150° C., 50° C. to 200° C., 50° C. to 250° C., 50° C. to 300° C., 75° C. to 100° C., 75° C. to 150° C., 75° C. to 200° C., 75° C. to 250° C., 75° C. to 300° C., 100° C. to 150° C., 100° C. to 200° C., 100° C. to 250° C., 100° C. to 300° C., 100° C. to 350° C., 150° C. to 200° C., 150° C. to 250° C., 150° C. to 300° C., 150° C. to 350° C., 200° C. to 250° C., 200° C. to 300° C., 200° C. to 350° C., 250° C. to 300° C., and 250° C. to 350° C.).

Exemplary adhesive materials include an acrylate (e.g., a silicone acrylate, a polymethyl acrylate, a polymethyl methacrylate, including those formed from 2-ethyl hexyl acrylate or n-butyl acrylate monomers, etc., such as any having a melting temperature of about 160° C.), a polyolefin (e.g., polyethylene, polybutene, or polypropylene), an acetate (e.g., an ethylene-vinyl acetate having a melting temperature of about 110° C.), a styrene (e.g., a polystyrene, a styrene block copolymer (e.g., styrene-butadiene-styrene, styrene-isoprene-styrene, styrene-ethylene/butylene-styrene, or styrene-ethylene/propylene), an isobutylene (e.g., polyisobutylene, a copolymer of isobutylene with isoprene, including copolymers thereof, as well as any having a melting temperature of about 100° C.), a rubber (e.g., a polyisoprene, a silicone rubber, a polychloroprene, a polyisobutylene, as well as copolymers of any of these), a polyamide, a polyester, a polyurethane, a polynitrile (e.g., nitrile butadiene rubber), a polyether (e.g., a vinyl ether), etc. The adhesive material can be provided in any useful format. For instance, the adhesive material can be provided as a substantially planar substrate having one or more removed portions to define one or more chambers or meltable elements. Such layers can be provided as a backing layer 5601, 6601 (e.g., a polyester layer) coated with an adhesive material 5602, 5603, 6602, 6603 (e.g., an acrylic). In some embodiments, the adhesive material is sterilized (e.g., by steam, ethylene oxide, ozone, bleach, radiation, etc.).

Energy Source

Any useful energy source can be used to melt the adhesive material. Exemplary energy sources include a heater (e.g., a resistive heater, such as a thin metal patterned on a surface, a Peltier heater, or a chemical heater), a thin film resistor, a heating element, a light source (e.g., a laser diode), etc. Additional energy sources are provided in U.S. Pat. Nos. 8,281,815, 8,240,336, 8,235,073, 7,926,514, 7,195,036, 6,679,279, 6,527,003, 6,521,188, and Guerin L J et al., "Miniature one-shot valve," *Proceedings of the Eleventh Annual International Workshop on Micro Electro Mechanical Systems (MEMS)*, 25-29 Jan. 1998, Heidelberg, Germany, pp. 425-8, each which is incorporated by reference in its entirety.

Multilayered Cartridges

The present apparatus can take any useful form, such as a multilayered or multilevel apparatus having multiple layers. For instance, the apparatus can be configured to include one or more chambers, channels, and microvalves in particular layers. These layers can be designed to incorporate a plurality of microvalves, to accommodate multiple reaction steps in a plurality of chambers, to simplify production of the device, as well as any other design considerations.

Multilevel or monolithic structures can be constructed using any useful method. Exemplary methods of fabrication include rapid prototyping, microfabrication (e.g., by casting, injection molding, compression molding, embossing, ablation, thin-film deposition, and/or Computer Numerically Controlled (CNC) micromachining), photolithography, etching techniques (e.g., wet chemical etching, reactive ion etching, inductively coupled plasma deep silicon etching, laser ablation, or air abrasion techniques), methods for integrating these structures into high-throughput analysis equipment (e.g., integration with a microplate reader or a control instrument, such as a computer), methods for fabricating and integrating other valves (e.g., one or more pneumatic valves), methods for integrating structures with a transducer array, methods for modifying surfaces (e.g., by including a layer of extracellular matrix components, such as fibronectin (FN), laminin, Matrigel™, and/or RGD peptide), methods for including one or more capture arrays (e.g., a capture array including one or more capture agents provided in a high-density array on a substrate), and methods for providing vias or inlets (e.g., by piercing, drilling, ablating, or laser cutting), such as those described in U.S. Pat. No. 8,257,964; and U.S. Pub. Nos. 2012/0231976, 2012/0214189, 2011/0129850, 2009/0251155, and 2009/0036324, each of which is incorporated herein by reference in its entirety.

Materials

The present microvalves and cartridges can be formed from any useful material. Exemplary materials include a polymer, such as polymethyl methacrylate (PMMA), polyethylene terephthalate (PET, e.g., biaxially-oriented PET or bo-PET), an acrylic polymer, poly(dimethylsiloxane) (PDMS), polycarbonate (PC), cyclo-olefin copolymer (COC), polyethylene terephthalate glycol (PETG), polyethylene (PE, such as branched homo-polymer PE), polyvinylchloride (PVC), polystyrene (PS), styrene copolymer, polyimide (PI), polypropylene (PP), polytetrafluoroethylene (PTFE), polynorbornene (PN), poly(4-methyl-1-pentene), silicone, and combinations or co-polymers thereof; silicon; glass; an adhesive, such as any described herein; as well as combinations thereof (e.g., combinations of such materials provided in separate layers or within the same layer). Polymers can include any useful additive, such as, e.g., fillers (e.g., mica, talc, or calcium carbonate), plasticizers (e.g., dioctyl phthalate), heat stabilizers (e.g., organo-tin compounds), antioxidants (e.g., phenols or amines), and/or UV stabilizers (e.g., benzophenones or salicylates). Such materials can be provided in any useful form, such as in one or more layers that can be laminated to provide the assembled cartridge.

Additional Components

The present cartridge can include one or more additional components, as described herein. For instance, one or more detection components can be provided, which can allow for detection by electrochemical, colorimetric, fluorescent, western blot, immunohistochemistry, immunoassay (e.g., lateral flow assay), immunochromatography, radio immunoassay, optical immunoassay, enzyme immunoassay, chemiluminescence, and/or electrochemiluminescence methods in any useful format.

The device can include one or more separation/extraction components (e.g., filters, posts, membranes, weirs (optionally including beads), matrices, or high voltage electrodes for performing on-chip capillary electrophoresis separations); heating components (e.g., electrodes or filaments); pumps (e.g., active or passive pumps, such as a low flow rate peristaltic pump or application of negative pressure, such as by actuating a valve); a membrane (e.g., placed within a channel and/or a chamber); a multifunctional sensor (e.g., to measure temperature, strain, and electrophysiological signals, such as by using amplified sensor electrodes that incorporate silicon metal oxide semiconductor field effect transistors (MOSFETs), a feedback resistor, and a sensor electrode in any useful design, such as a filamentary serpentine design); a microscale light-emitting diode (LEDs, such as for optical characterization of the test sample); an active/passive circuit element (e.g., such as transistors, diodes, and resistors); an actuator; a wireless power coil; a device for radio frequency (RF) communications (e.g., such as high-frequency inductors, capacitors, oscillators, and antennae); a resistance-based temperature sensor; a photodetector; a photovoltaic cell; a diode; a data-processing circuit powered by the power source and electrically connected to the energy source; and/or one or more components for autonomous remote monitoring of a sample, such as an analog-to-digital converter, a radiofrequency module, and/or a telemetry unit (e.g., configured to receive processed data from a data-processing circuit electrically connected to the detection component and to transmit the data wirelessly).

Kits

The present apparatus can further be provided in a kit. The kit can include one or more of the following: a collection swab for collecting a test sample, a cartridge (e.g., a disposable cartridge) having one or more valves described herein, on-chip reagents stored within a cartridge (e.g., any described herein). a power source for activating the energy source (e.g., a battery), an external heater for incubating the test sample within the apparatus, a detection component (e.g., a light-emitting diode and/or a photodiode), and/or a telemetry unit.

Methods of Use

The present cartridge includes one or more valves that can be integrated with any assay for detecting any target of interest (e.g., any described herein). In particular, the cartridge of the invention is disposable, thereby facilitating single-use detection of samples that could be easily contaminated or could be potentially hazardous (e.g., infectious). In some embodiments, the cartridge is configured for sensing a nucleic acid (e.g., DNA or RNA), as well as for detecting a pathogen (e.g., a bacterial pathogen, such as any herein), metabolite, genetic modification, and/or pesticide for any use (e.g., livestock monitoring, crop maintenance, as well as any other agricultural use). Exemplary uses include any useful methodology for detection a target (e.g., any described herein), such as polymerase chain reaction amplification, cell culture techniques, etc.

Targets and Samples

The present cartridge can be used to detect any useful targets. Exemplary targets include a bacterium, such as such as *Bacillus* (e.g., *B. anthracis*), Enterobacteriaceae (e.g., *Salmonella, Escherichia coli, Yersinia pestis, Klebsiella*, and *Shigella*), *Yersinia* (e.g., *Y. pestis* or *Y. enterocolitica*), *Staphylococcus* (e.g., *S. aureus*), *Streptococcus*, *Gonorrheae*, *Enterococcus* (e.g., *E. faecalis*), *Listeria* (e.g., *L. monocytogenes*), *Brucella* (e.g., *B. abortus, B. melitensis*, or *B. suis*), *Vibrio* (e.g., *V. cholerae*), *Corynebacterium diphtheria*, *Pseudomonas* (e.g., *P. pseudomallei* or *P. aeruginosa*), *Burkholderia* (e.g., *B. mallei* or *B. pseudomallei*), *Shigella* (e.g., *S. dysenteriae*), *Rickettsia* (e.g., *R. rickettsii*, *R. prowazekii*, or *R. typhi*), *Francisella tularensis*, *Chlamydia psittaci*, *Coxiella burnetii*, *Mycoplasma* (e.g., *M. mycoides*), etc.; an allergen, such as peanut dust, mycotoxins, mold spores, or bacterial spores such as *Clostridium botulinum* and *C. perfringens*; a toxin, such as ricin, mycotoxin, tetrodotoxin, anthrax toxin, botulinum toxin, staphylococcal entertoxin B, or saxitoxin; a virus, such as Adenoviridae (e.g., adenovirus), Arenaviridae (e.g., Machupo virus), Bunyaviridae (e.g., Hantavirus or Rift Valley fever virus), Coronaviridae, Orthomyxoviridae (e.g., influenza viruses), Filoviridae (e.g., Ebola virus and Marburg virus), Flaviviridae (e.g., Japanese encephalitis virus and Yellow fever virus), Hepadnaviridae (e.g., hepatitis B virus), Herpesviridae (e.g., herpes simplex viruses), Papovaviridae (e.g., papilloma viruses), Paramyxoviridae (e.g., respiratory syncytial virus, measles virus, mumps virus, or parainfluenza virus), Parvoviridae, Picornaviridae (e.g., polioviruses), Poxviridae (e.g., variola viruses), Reoviridae (e.g., rotaviruses), Retroviridae (e.g., human T cell lymphotropic viruses (HTLV) and human immunodeficiency viruses (HIV)), Rhabdoviridae (e.g., rabies virus), and Togaviridae (e.g., encephalitis viruses, yellow fever virus, and rubella virus)); a protozoon, such as *Cryptosporidium parvum*, Encephalitozoa, *Plasmodium, Toxoplasma gondii, Acanthamoeba, Entamoeba histolytica, Giardia lamblia, Trichomonas vaginalis, Leishmania*, or *Trypanosoma* (e.g., *T. brucei* and *T. Cruzi*); a helminth, such as cestodes (tapeworms), trematodes (flukes), or nematodes (roundworms, e.g., *Ascaris lumbricoides, Trichuris trichiura, Necator americanus*, or *Ancylostoma duodenale*); a parasite (e.g., any protozoa or helminths described herein); a fungus, such as Aspergilli, Candidae, *Coccidioides immitis*, and Cryptococci; a pathogen; an environmental contaminant; a water additive; an agricultural marker; a nucleic acid (e.g., oligonucleotides, polynucleotides, nucleotides, nucleosides, molecules of DNA, or molecules of RNA, including a chromosome, a plasmid, a viral genome, a primer, or a gene); a genetic modification (e.g., antibiotic resistance marker gene); a protein (e.g., a glycoprotein, a metalloprotein, an enzyme, a prion, or an immunoglobulin); a metabolite; a sugar; a lipid; a lipopolysaccharide; a salt; or an ion. Targets also include food-borne pathogens, such as *Salmonella* (e.g., *Salmonella Typhimurium*), pathogenic *E. coli* (e.g., O157:H7), *Bacillus* (e.g., *B. cereus*), *Clostridium botulinum*, *Listeria monocytogenes, Yersinia* (e.g., *Y. enterocolitica*), Norovirus (e.g., Norwalk virus), *Shigella, Staphylococcus aureus, Toxoplasma gondii, Vibrio* (e.g., *V. vulnificus, V. cholera, V. parahaemolyticus*), *Campylobacter jejuni*, and *Clostridium perfringens*; and weaponized pathogens, such as *Bacillus anthracis, Yersinia pestis, Francisella tularensis, Brucella* (e.g., *B. suis*), *Burkholderia mallei, Burkholderia pseudomallei, Shigella, Clostridium botulinum*, Variola (e.g., *V. major*), Filoviridae (e.g., Ebola virus and Marburg virus), Arenaviridae (e.g., Lassa virus and Machupo virus), *Clostridium perfringens*, any food-borne pathogen (e.g., *Salmonella* species, *Escherichia coli* O157:H7, or *Shigella*), *Chlamydia psittaci, Coxiella burnetii, Staphylococcal aureus, Rickettsia* (e.g., *R. prowazekii* or *R. rickettsii*), Alphavirus (e.g., Venezuelan equine encephalitis virus, eastern equine encephalitis virus, or western equine encephalitis virus), *Vibrio cholerae, Cryptosporidium parvum*, Henipavirus (e.g., Nipah virus), Bunyaviridae (e.g., Hantavirus or Rift Valley fever virus), Flaviviridae (e.g., Japanese encephalitis virus and Yellow fever virus), and *Coccidioides* spp.

The test sample can include any useful sample, such as a microorganism, a virus, a bacterium, a fungus, a parasite, a helminth, a protozoon, a cell, tissue, a fluid, a swab, a biological sample (e.g., blood, serum, plasma, saliva, etc.), a plant, an environmental sample (e.g., air, soil, and/or water), etc.

EXAMPLE

Example 1: NC and NO Valve Geometry in a Multilayered Cartridge

Figure 3:
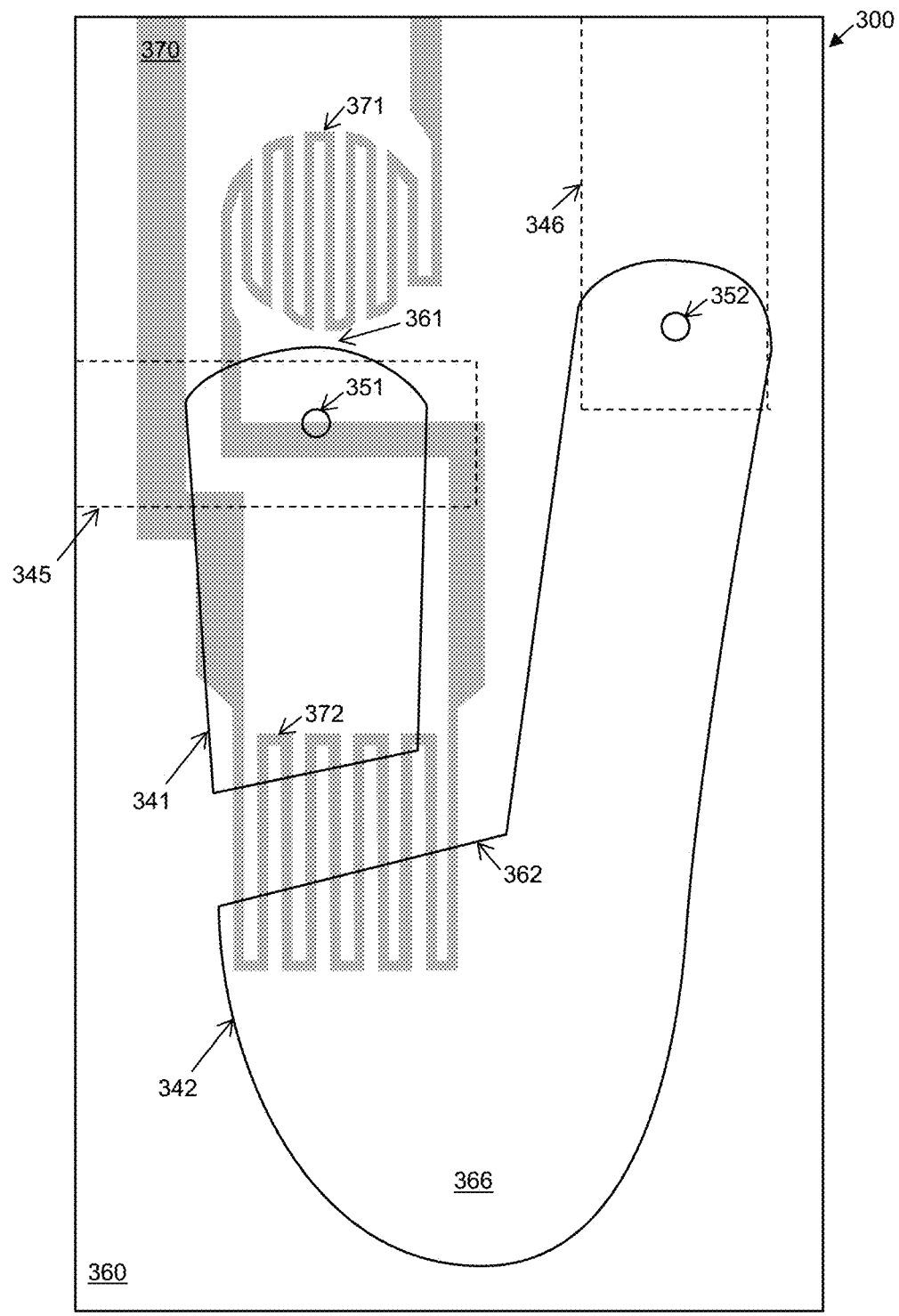
FIG. 3 is a schematic showing a plan view of an exemplary cartridge 300 having both an NC microvalve and an NO microvalve.

The present invention includes the use of laser-cut adhesive materials to construct both normally-open and normally-closed microvalves for fluid control within microfluidic laminate cartridges used in medical and biological investigations. Such valves can be integrated in a multilayered device, as shown in FIG. 3.

The normally-open valve includes three components: a precisely-cut polyester/acrylic adhesive material 360, a via 351 connecting two fluidic layers (e.g., connecting chambers 341, 345 located in different fluidic layers), and a miniaturized thermal source 371. The miniaturized thermal source can include microfabricated metal heaters defined using conventional photolithography processes onto glass. The miniaturized heaters are defined such that when the layers of the laminate cartridge are assembled, they overlap specific features in the adhesive materials and they are within close proximity to the fluidic via.

Once sufficient power is placed upon the miniaturized thermal source (~0.85 W for the device geometries and construction in FIG. 3), the polyester/acrylic adhesive material begins to melt. The geometry of the valve design wicks melted material away from the hotspot and into the fluidic via 351. This process takes on the order of tens of seconds to complete, after which power is removed, and the polymer solidifies within the via and plugs it to gas and fluid flow.

The normally-closed valve includes two components: a precisely-cut polyester/acrylic adhesive material 360 and a miniaturized thermal source 372. A layer of adhesive material (on the order of 275 μm wide for the design in FIG. 3) is defined such that a thin strip of adhesive 362 divides a fluid channel and prevents gas or liquid flow. Once sufficient power is placed upon the miniaturized thermal source (~0.85 W), the polyester/acrylic adhesive material begins to melt. The geometry of the valve design wicks melted material away from the hotspot and into the area 366 around the adhesive divider. This process takes on the order of seconds to complete, after which a pneumatic or fluid pulse is delivered that sweeps melted material away from the hotspot and opens the channel to flow. Power is removed and the remaining polymer solidifies, leaving a clear path for gas and fluid flow.

The adhesive material, via, and thermal source can have any useful configuration. In one non-limiting example, the center-to-center spacing from the heat source to the via should not exceed about 1.5 mm. In one embodiment, the adhesive tape thickness is about 3 mils (e.g., about 76 μm), in which 1 mil is the backing layer (e.g., a polymer, such as any described herein) and 1 mil of adhesive is present on each side of the substrate. In one embodiment, the heat source is circular and of approximately 1 mm in diameter having several meander lines of electron beam deposited Cr/Au that are lithographically patterned on the substrate.

The present invention has certain advantages, such as very high temperature resistance (e.g., the use of high melting point materials means that proper adhesive material choice would create structures robust enough to survive through an autoclave sterilization of biomedical cartridges), positioning of valves close to high temperature processing steps (e.g., such as long-strand DNA melting or fluid boiling), simplified fabrication (e.g., requires no additional materials or precision deposition/alignment capability to manufacture these valves, thus lowering production cost and easing manufacturing burden), biocompatibility (e.g., by selecting proper adhesives, which assures applicability for live cell handling and sensitive culturing steps), reduction of leaking (e.g., providing gas- and liquid-tight seals due to the strong nature of adhesive seals), and wide chemical compatibility depending on adhesive choice.

Other Embodiments

All publications, patents, and patent applications mentioned in this specification are incorporated herein by reference to the same extent as if each independent publication or patent application was specifically and individually indicated to be incorporated by reference.

While the invention has been described in connection with specific embodiments thereof, it will be understood that it is capable of further modifications and this application is intended to cover any variations, uses, or adaptations of the invention following, in general, the principles of the invention and including such departures from the present disclosure that come within known or customary practice within the art to which the invention pertains and may be applied to the essential features hereinbefore set forth, and follows in the scope of the claims.

Other embodiments are within the claims.

The invention claimed is:
1. A normally-open microvalve assembly comprising:
a first chamber disposed in a first layer;
a second chamber disposed in a second layer;
a fluidic opening disposed in an intermediate layer that is disposed between the first layer and the second layer, wherein each of the first and second chambers is, independently, configured to receive one or more fluids;
a substantially planar layer disposed between the first layer and the intermediate layer, wherein the substantially planar layer comprises a backing layer having a top side and a bottom side and a layer of an adhesive material disposed on the top and bottom sides, wherein the adhesive material has a melting temperature from about 100° C. to about 250° C., wherein the substantially planar layer comprises a removed portion and a meltable element, wherein the meltable element is disposed in proximity to the fluidic opening, and wherein the removed portion provides an edge that forms a portion of the first chamber; and
an energy source in contact with at least a portion of the meltable element, wherein the energy source is configured to provide a melted adhesive material,
thereby allowing the melted adhesive material to substantially block the fluidic opening in order to substantially minimize fluidic communication between the first and second chambers.

2. The assembly of claim 1, wherein the substantially planar layer comprises an adhesive tape.

3. The assembly of claim 1, wherein the adhesive material comprises an acrylate, an acetate, and/or a styrene.

4. The assembly of claim 1, wherein a center-to-center spacing between the fluidic opening and the energy source is less than about 2 mm.

5. The assembly of claim 1, wherein each of the first and second chambers is, independently, a microfluidic channel, a nanofluidic channel, or a reservoir.

6. The assembly of claim 1, wherein:
the meltable element is disposed in proximity to the via and is configured to substantially block the via upon melting of the adhesive material.

7. The assembly of claim 6, wherein the substantially planar layer is disposed above the intermediate layer.

8. The assembly of claim 7, wherein the energy source is disposed above the substantially planar layer.

9. A normally-closed microvalve assembly comprising:
a first layer;
a first chamber and a second chamber, wherein each is independently configured to receive one or more fluids, and wherein both of the first and second chambers are located in the first layer;
a substantially planar layer disposed above the first layer, wherein the substantially planar layer comprises a backing layer having a top side and a bottom side and a layer of an adhesive material disposed on the top and bottom sides, wherein the adhesive material has a melting temperature from about 100° C. to about 250° C., wherein the substantially planar layer comprises a first removed portion, a second removed portion, and a meltable element, wherein the meltable element forms a fluidic barrier between the first and second chambers, wherein the first removed portion forms the first chamber, and wherein the second removed portion forms the second chamber; and
an energy source in contact with at least a portion of the meltable element, wherein the energy source is configured to melt the adhesive material,
thereby allowing the fluidic barrier to be melted in order to substantially establish fluidic communication between the first and second chambers.

10. The assembly of claim 9, wherein the fluidic barrier, the first chamber, and the second chamber are each disposed in the first layer, and wherein the first layer comprises the adhesive material.

11. The assembly of claim 9, wherein the adhesive material comprises an acrylate, an acetate, and/or a styrene.

12. The assembly of claim 9, wherein the fluidic barrier divides a chamber in the first layer into the first and second chambers.

13. The assembly of claim 12, further comprising a retaining chamber configured to receive the melted adhesive material of the fluidic barrier.

14. A fluidic cartridge comprising:
a first fluidic chamber in fluidic communication with a first chamber;
a second fluidic chamber in fluidic communication with a second chamber; and
one or more single-use microvalve assemblies, wherein at least one of the single-use microvalve assemblies comprises:
the first chamber disposed in a first layer;
the second chamber disposed in a second layer;
a fluidic opening disposed in an intermediate layer that is disposed between the first layer and the second layer, wherein each of the first and second chambers is, independently, configured to receive one or more fluids;
a substantially planar layer disposed between the first layer and the intermediate layer, wherein the substantially planar layer comprises a backing layer having a top side and a bottom side and a layer of an adhesive material disposed on the top and bottom sides, wherein the adhesive material has a melting temperature from about 100° C. to about 250° C., wherein the substantially planar layer comprises a removed portion and a meltable element, wherein the meltable element is disposed in proximity to the fluidic opening, and wherein the removed portion provides an edge that forms a portion of the first chamber; and
an energy source in contact with at least a portion of the meltable element, wherein the energy source is configured to provide a melted adhesive material,
thereby allowing the melted adhesive material to substantially block the fluidic opening in order to substantially minimize fluidic communication between the first and second chambers.

15. A fluidic cartridge comprising:
a first fluidic chamber in fluidic communication with a first chamber;
a second fluidic chamber in fluidic communication with a second chamber; and
one or more single-use microvalve assemblies, wherein at least one of the single-use microvalve assemblies comprises:
a first layer;
the first chamber and the second chamber, wherein each is independently configured to receive one or more fluids, and wherein both of the first and second chambers are located in the first layer;

a substantially planar layer disposed above the first layer, wherein the substantially planar layer comprises a backing layer having a top side and a bottom side and a layer of an adhesive material disposed on the top and bottom sides, wherein the adhesive material has a melting temperature from about 100° C. to about 250° C., wherein the substantially planar layer comprises a first removed portion, a second removed portion, and a meltable element, wherein the meltable element forms a fluidic barrier between the first and second chambers, wherein the first removed portion forms the first chamber, and wherein the second removed portion forms the second chamber; and an energy source in contact with at least a portion of the meltable element, wherein the energy source is configured to melt the adhesive material, thereby allowing the fluidic barrier to be melted in order to substantially establish fluidic communication between the first and second chambers.

16. A multilayered, fluidic cartridge comprising:
a first channel disposed in a top layer;
a second channel disposed in a bottom layer;
an intermediate layer disposed between the top layer and the bottom layer, wherein the intermediate layer comprises a fluidic opening configured for fluidic communication between the first and second channels;
a substantially planar layer disposed between the top layer and the intermediate layer, wherein the substantially planar layer comprises a backing layer having a top side and a bottom side, a layer of an adhesive material disposed on the top and bottom sides, and a first meltable element in proximity to the fluidic opening and a removed portion; and
a first energy source in contact with at least a portion of the first meltable element, wherein the first energy source is configured to melt the adhesive material, thereby allowing melted adhesive material to substantially block the fluidic opening in order to substantially minimize fluidic communication between the first and second channels.

17. The multilayered, fluidic cartridge of claim 16, wherein the substantially planar layer further comprises a second meltable element disposed in the first channel to form a fluidic barrier.

18. The multilayered, fluidic cartridge of claim 17, wherein a second energy source is in contact with at least a portion of the second meltable element, and wherein the second energy source is configured to melt the adhesive material of the second meltable element, thereby allowing the fluidic barrier to be melted.

19. The multilayered, fluidic cartridge of claim 18, wherein the intermediate layer further comprises a retaining chamber to be aligned with the fluidic barrier.

20. The multilayered, fluidic cartridge of claim 18, wherein the first and second energy sources are disposed above the substantially planar layer.

21. The multilayered, fluidic cartridge of claim 20, wherein the first and second energy sources are disposed in a top layer.

22. A method of fabricating a microvalve assembly, the method comprising:
i) providing a first layer comprising a lower chamber;
ii) aligning a portion of an adhesive layer with the lower chamber, wherein the adhesive layer comprises a substantially planar layer comprising a backing layer having a top side and a bottom side and a layer of adhesive material disposed on the top and bottom sides, wherein the adhesive material has a melting temperature from about 100° C. to about 250° C., wherein the adhesive layer comprises a first removed portion and a first meltable element, and wherein the first removed portion provides an edge that forms a portion of a first chamber; and
iii) contacting an energy source with at least a portion of the first meltable element, wherein the first meltable element comprises an area of the adhesive layer in proximity to the first chamber,
thereby forming the microvalve assembly disposed between the lower chamber and the first chamber.

23. The method of claim 22, wherein step ii) further comprises contacting and/or bonding the portion of the adhesive layer with the lower chamber.

24. The method of claim 22, further comprising:
iv) providing a top layer disposed above the energy source.

25. The method of claim 22, wherein the adhesive layer further comprises a second removed portion that provides an edge that forms a portion of a second chamber.

26. The method of claim 25, wherein step ii) provides a normally-closed microvalve assembly.

27. The method of claim 25, wherein step ii) provides a normally-open microvalve assembly.

28. The method of claim 22, further comprising, prior to step ii), disposing an intermediate layer between the first layer and the adhesive layer.

29. The method of claim 28, further comprising aligning a portion of the intermediate layer with the lower chamber, wherein the intermediate layer comprises at least one fluidic opening.

30. The method of claim 29, wherein the portion of the intermediate layer comprises the at least one fluidic opening.

* * * * *